(12) United States Patent
Dhoolia et al.

(10) Patent No.: US 8,583,965 B2
(45) Date of Patent: Nov. 12, 2013

(54) SYSTEM AND METHOD FOR DYNAMIC CODE ANALYSIS IN PRESENCE OF THE TABLE PROCESSING IDIOM

(75) Inventors: Pankaj Dhoolia, Dadri (IN); Mangala Gowri Nanda, New Delhi (IN); Diptikalyan Saha, West Bengal (IN); Krishna Nandivada Venkata, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 13/164,799

(22) Filed: Jun. 21, 2011

(65) Prior Publication Data

US 2012/0331350 A1      Dec. 27, 2012

(51) Int. Cl.
*G06F 11/00* (2006.01)

(52) U.S. Cl.
USPC ........................................................ 714/38.1

(58) Field of Classification Search
USPC ........................................................ 714/38.1
See application file for complete search history.

(56) References Cited

U.S. PATENT DOCUMENTS

| | | | |
|---|---|---|---|
| 5,854,925 A | 12/1998 | Shimomura | |
| 6,279,149 B1 | 8/2001 | Field et al. | |
| 2004/0226006 A1 | 11/2004 | Russell | |
| 2009/0249307 A1 | 10/2009 | Yoshida | |
| 2010/0069035 A1* | 3/2010 | Johnson | 455/404.1 |
| 2010/0306745 A1 | 12/2010 | Sharabani et al. | |
| 2011/0016457 A1 | 1/2011 | Artzi et al. | |

OTHER PUBLICATIONS

Willmore, et al., "Program Slicing in the Presence of Database State," Proceedings 20th IEEE International Conference on Software Maintenance, pp. 1-5, 2004.
Zhang, et al., "Locating Faulty Code by Multiple Points Slicing," Software Practice and Experience, 37, pp. 935-996, 2007.
Diptikalyan Saha et al., "Fault Localization in ABAP Programs", Computer Science, pp. 1-27, Feb. 11, 2011.
F. Tip, A Survey of Program Slicing Techniques, Journal of programming languages, 3(3) pp. 121-189, 1995.
D.W. Binkley and K.B. Gallagher, Program slicing. Advances in Computers, 43: pp. 1-50, 1996.
A. Groce and W. Visser. What went wrong: Explaining counterexamples. In Proceedings of SPIN Workshop on Model Checking of Software, pp. 1-15, 2003.

(Continued)

*Primary Examiner* — Bryce Bonzo
(74) *Attorney, Agent, or Firm* — Gibb & Riley, LLC

(57) ABSTRACT

Systems and methods execute a computer program to produce a trace of the computer program and divide the trace into independent threads of execution. Each of the independent threads of execution comprises an execution sequence of the lines of programming code that ends with an identified write line of programming code that outputs an incorrect result. These systems and methods also identify key field within each of the independent threads of execution. In programming, which is processing records in a table one by one, key-fields are a subset of the fields of the table. The key fields impact the computations sequence leading up to the identified write line of the programming code. These systems and methods identify key-based dynamic slices from the independent threads of execution. Each of the key-based dynamic slices includes lines of programming code that are used in computations, processing the table records corresponding to the key fields.

25 Claims, 16 Drawing Sheets

```
1   SELECT uid name price FROM dbtab INTO tab
2   SELECT uid discount FROM dbstab INTO stab
3   SORT tab uid
4   DELETE ADJ DUP from tab COMPARING uid, item
5   LOOP AT tab INTO wa
6     AT NEW uid
7       CLEAR sum
8     ENDAT
9     sum = sum + wa.price
10    READ stab INTO fa WHERE uid = wa.uid
11    IF subrc = 0
12      sum = sum - fa.discount
13    ENDIF
14    AT END uid
15      WRITE name sum
16    ENDAT
17  ENDLOOP
```

(56) References Cited

OTHER PUBLICATIONS

T. Ball, M. Naik, and S.K. Rajamani. From symptom to cause: Localizing error in counterexample traces. In Proceedings of POPL, pp. 1-9, 2003.

Diptikalyan Saha et al., "Fault Localization for Data-Centric Programs", Foundations of Software Engineering (FSE) Conference, pp. 1-11, Mar. 12, 2011.

Hiralal Agrawal et al., "Dynamic Program Slicing", pp. 1-11, 1990.

* cited by examiner

```
1   SELECT uid name price FROM dbtab INTO tab
2   SELECT uid discount FROM dbstab INTO stab
3   SORT tab uid
4   DELETE ADJ DUP from tab COMPARING uid, item
5   LOOP AT tab INTO wa
6     AT NEW uid
7       CLEAR sum
8     ENDAT
9     sum = sum + wa.price
10    READ stab INTO fa WHERE uid = wa.uid
11    IF subrc = 0
12      sum = sum - fa.discount
13    ENDIF
14    AT END uid
15      WRITE name sum
16    ENDAT
17  ENDLOOP
```

FIG. 1 tab

| uid | item | price |
|-----|------|-------|
| 1   | a1   | 10.0  |
| 1   | a2   | 11.0  |
| 1   | a3   | 12.0  |
| 1   | a4   | 15.0  |
| 2   | b1   | 13.0  |
| 3   | c1   | 14.0  |
| 4   | d1   | 15.0  |
| 4   | d1   | 15.0  |
| 5   | e1   | 16.0  |
| 5   | e2   | 17.0  |
| 5   | e2   | 17.0  |
| 5   | e3   | 18.0  | stab

| uid | discount |
|-----|----------|
| 4   | 2.0      |
| 5   | 3.0      |

FIG. 2

| $\#_i$ | i | $E_t$ | statement | CD |
|---|---|---|---|---|
| 1 | 0 | | SELECT ... | |
| 2 | 0 | | SELECT ... | |
| 3 | 0 | | SORT tab using uid | |
| 4 | 0 | | DEL ADJDUP tab using uid, item | |
| $5_0$ | 0 | $E_1$ | wa = (1,a,10.0) | |
| $6_0$ | | | AT NEW = *true* (uid = 1) | $6_0$ (uid =1) |
| $7_0$ | | | sum = 0.0 | $5_0$ |
| $8_0$ | | | ENDAT | $5_0$ |
| $9_0$ | | | sum = sum + wa.price (10.0) | |
| $5_1$ | 1 | | wa = (1,a,11.0) | |
| $9_1$ | | | sum = sum + wa.price (21.0) | |
| $5_2$ | 2 | | wa = (1,a,12.0) | |
| $9_2$ | | | sum = sum + wa.price (33.0) | |
| $14_2$ | | | AT END = *true* (uid = 1) | |
| $15_2$ | | | print 133.0 | $14_2$ (uid = 1) |
| $16_2$ | | | ENDAT | |
| $5_3$ | 3 | $E_2$ | wa = (2,b,13.0) | |
| $6_3$ | | | AT NEW = *true* (uid = 2) | |
| $7_3$ | | | sum = 0.0 | $6_3$ (uid =2) |
| $8_3$ | | | ENDAT | |
| $9_3$ | | | sum = sum + wa.price (13.0) | |
| $14_3$ | | | AT END = *true* (uid = 2) | |
| $15_3$ | | | print 213.0 | $14_3$ (uid = 2) |
| $16_3$ | | | ENDAT | |
| $5_4$ | 4 | $E_3$ | wa = (3,c,14.0) | |
| $6_4$ | | | AT NEW = *true* (uid = 3) | |
| $7_4$ | | | sum = 0.0 | $6_4$ (uid =3) |
| $8_4$ | | | ENDAT | |
| $9_4$ | | | sum = sum + wa.price (14.0) | |
| $14_4$ | | | AT END = *true* (uid = 3) | |
| $15_4$ | | | print 314.0 | $14_4$ (uid = 3) |
| $16_4$ | | | ENDAT | |

FIG. 3A

| | | | | |
|---|---|---|---|---|
| $5_5$<br>$6_5$<br>$7_5$<br>$8_5$<br>$9_5$<br>$10_5$<br>$11_5$<br>$12_5$<br>$13_5$<br>$14_5$<br>$15_5$<br>$16_5$ | 5 | $E_4$ | wa = (4,d,15.0)<br>AT NEW = *true* (uid = 4)<br>    sum = 0.0<br>ENDAT<br>sum = *sum* + *wa.price* (15.0)<br>READ (uid = 4, discount = 2.0)<br>IF subrc = 0<br>    sum = *sum* - *fa.dsc* (13.0)<br>ENDIF<br>AT END = *true* (uid = 4)<br>    print 413.0<br>ENDAT | $6_5$ (uid = 4)<br><br><br><br>$11_5$ (subrc = 0)<br><br>$14_5$ (uid = 4) |
| $5_6$<br>$6_6$<br>$7_6$<br>$8_6$<br>$9_6$<br>$10_6$<br>$11_6$<br>$12_6$<br>$13_6$<br>$5_7$<br>$9_7$<br>$10_7$<br>$11_7$<br>$12_7$<br>$13_7$<br>$5_8$<br>$9_8$<br>$10_8$<br>$11_8$<br>$12_8$<br>$13_8$<br>$14_8$<br>$15_8$<br>$16_8$ | 6 | $E_5$ | wa = (5,e,16.0)<br>AT NEW = *true* (uid = 5)<br>    sum = 0.0<br>ENDAT<br>sum = *sum* + *wa.price* (16.0)<br>READ (uid = 5, discount = 3.0)<br>IF subrc = 0<br>    sum = *sum* - *fa.dsc* (13.0)<br>ENDIF<br>wa = (5,e,17.0)<br>sum = *sum* + *wa.price* (30.0)<br>READ (uid = 5, discount = 3.0)<br>IF subrc = 0<br>    sum = *sum* - *fa.dsc* (27.0)<br>ENDIF<br>wa = (5,e,18.0)<br>sum = *sum* + *wa.price* (45.0)<br>READ (uid = 5, discount = 3.0)<br>IF subrc = 0<br>    sum = *sum* - *fa. dsc* (42.0)<br>ENDIF<br>AT END = *true* (uid = 5)<br>    print 542.0<br>ENDAT | $6_6$ (uid =5)<br><br><br><br>$11_6$ (subrc = 0)<br><br><br><br><br>$11_7$ (subrc = 0)<br><br><br><br><br>$11_8$ (subrc = 0)<br><br>$14_8$ (uid = 5) |

FIG. 3B

|  | Class 1 Sequence | $E_1$ | Class 2 bag | $E_1$ | Class 3 loops | $E_1$ |
|---|---|---|---|---|---|---|
| $G_1$ | 5,6,7,9,14,5,9 5,9,14,15 | $E_1$ | 5,6,7,9,14,15 | $E_1, E_2$ $E_3$ | {5,6,7,9,14}{5,9} {5,9,14,15} | $E_1$ |
| $G_2$ | 5,6,7,9,14,15 | $E_2,E_3$ | 5,6,7,9,10,11,12,14,15 | $E_4, E_5$ | {5,6,7,9,14,15} | $E_2,E_3$ |
| $G_3$ | 5,6,7,9,10,11,12,14,15 | $E_4$ | | | {5,6,7,9,10,11,12,14,15} | $E_4$ |
| $G_4$ | 5,6,7,9,10,11,12,14 5,9,10,11,12,14 5,9,10,11,12,14,15 | $E_5$ | | | {5,6,7,9,10,11,12,14} {5,9,10,11,12,14} {5,9,10,11,12,14,15} | $E_5$ |

FIG. 4

```
1   SELECT CustId ItemId Price from OrderTab INTO itab
2   SELECT CustId Discount from DiscountTab INTO stab
3
4   SORT itab CustId ItemId
5   DEL from itab where Year <= CurrentYear-2.
6   LOOP AT itab INTO wa
7     AT NEW Custid
8       amount = 0.
9     ENDAT
0     amount = amount + wa.Price
1     READ stab INTO fa WHERE CustId = wa.CustId
2     IF subrc = 0
3       amount = amount - fa.Discount
4     ENDIF
5     AT END id
6       WRITE id amount
7     ENDAT
8   ENDLOOP
```

FIG. 5

| command | description |
|---|---|
| SELECT | project selected columns from a relational database table dbtab into itab, Which is a table internal to the program |
| SORT | sorts the specified internal table on specified key(s) |
| DEL | deletes rows from a table that satisfies the condition |
| LOOP | iterates over an internal table, reading one row at a time into the local record wa |
| AT NEW / (AT END) | a predicate that is true for a given row and field name(s) When the row is the first (last) one in the table or when the field's value in the current row is different from the previous (next) row |
| READ | selects a row from table stab based on the key value. If ore than one row matches, the last row is returned |
| WRITE | prints the specified data |

FIG. 6

(a) Order Tab

| CustId | ItemId | Price | Year |
|---|---|---|---|
| 1 | I1 | 10.0 | 2009 |
| 1 | I2 | 10.0 | 2011 |
| 2 | I3 | 10.0 | 2011 |

Discount Tab

| CustId | Discount | Year |
|---|---|---|
| 1 | 2.0 | 2011 |
| 2 | 3.0 | 2011 |

Output

| CustId | Amount | |
|---|---|---|
| 1 | 8.0 | X [18.0✓] |
| 2 | 7.0 | ✓ |

(b) Slice
①─②─④─⑤─⑦─⑧─⑩─⑪─⑫─⑬  Line 16,<1,8.0>
①─②─④─⑤─⑦─⑧─⑩─⑪─⑫─⑬  Line 16,<2,7.0>

(c) Key Slice
①─②─④─[⑤]─⑦─⑧─⑩─⑪─⑫─⑬─⑮─⑯  Line 16,<1,8,0> Key:<CusId,1>
①─②─④──────⑦─⑧─⑩─⑪─⑫─⑬─⑮─⑯  Line 16,<2,7,0> Key:<CusId,2>

FIG. 7

PRECISE
KEY-VALUE, SEQUENCE
KEY-VALUE
FIELD AND ROW SENSITIVE
NON FIELD AND ROW SENSITIVE
IMPRECISE

FIG. 8

```
1   Function KeySlice (I^q, V, S)
2   Input: int I^q / *sequenceid*/,  Set V /* set of vars */
3   Output:  List S /* List of statements */
4
5   Set Φ = V;
6   int i = I^q
7   key-value-pairs kvp = kvpairs ;// computed or user provided
8   while i >0
9   * s = stmt.get (i):
10    duSet = get_def_use(s): //statement specific
11    if(field_row_sensitive_inclusion_check(s.duSet,Φ))
12      && (!key_assumption_valid ||
13        (key_assumption_valid && check_kv_constraint (kvp,s))
14          && (!sequence_valid || (sequence_valid &&
15            check_sequence_constraint(kvp, s, Φ)))
16            slice.add(s):
17            Φ = update_dep_set(Φ,duSet):
18            key_assumption_valid=check_key_assumption(Φ,kvp);
19          sequence_valid=check_sequence_assumption(Φ);
20    endif
21  endwhile
22  return slice;
23
24  check_kv_constraint kvp, s
25     if s is not operating on table
26        return true
27
28     if any change by s satisfies kvp
29        return true;
30     else
31        return false;
32     endif
33
34  check_sequence_constraint kvp, s, Φ
35     if s is not operating on table
36        return true
37
38
39     c = changes by s that satisfies kvp
40     if check_sequence_assumption (c∪Φ)
41        return true
42     else
43        return false:
44
```

FIG. 9A

```
45
46   check_key_assumption Φ, kvp
47      for each structure variable v.f
48         if f ∈ kvp.keySet
49            if value of v.f ! = kvp.getValue(f)
50               return false
51      return true
52
53   check_sequence_asumption Φ
54      for all itab
55         for any f
56            I = set of all i s.t itab[i].f ∈ Φ
57            if I is not in sequence
58               return false
59      return false
```

FIG. 9B

| Seq | Trace | $T_t/T_f$ |
|---|---|---|
| 1 | 1,2,3,4,5,6,7,9,14,5,9 5,9,14,15 | $T_t$ |
| 2 | 1,2,3,4,5,6,7,9,14,15 | $T_t$ |
| 3 | 1,2,3,4,5,6,7,9,14,15 | $T_t$ |
| 4 | 1,2,3,4,5,6,7,9,10,11,12,14,15 | $T_t$ |
| 5 | 1,2,3,4,5,6,7,9,10,11,12,14 5,9,10,11,12,14 5,9,10,11,12,14 5,9,10,11,12,14,15 | $T_f$ |

FIG. 10

| Seq | Trace | $T_t/T_f$ |
|---|---|---|
| 1 | {1,2,3,4}, {5,6,7,9,14}, {5,9} {5,9,14,15} | $T_t$ |
| 2 | {1,2,3,4}, {5,6,7,9,14,15} | $T_t$ |
| 3 | {1,2,3,4}, {5,6,7,9,14,15} | $T_t$ |
| 4 | {1,2,3,4}, {5,6,7,9,10,11,12,14,15} | $T_t$ |
| 5 | {1,2,3,4}, {5,6,7,9,10,11,12,14} {5,9,10,11,12,14} {5,9,10,11,12,14,15} | $T_f$ |

FIG. 11

| Seq | Trace | $T_t/T_f$ |
|---|---|---|
| 1 | {1,2,3,4}, {5,6,7,9,14}, {5,9} {5,9,14,15} | $T_t$ |
| 2 | {1,2,3,4}, {5,6,7,9,14,15} | $T_t$ |
| 3 | {1,2,3,4}, {5,6,7,9,10,11,12,14,15} | $T_t$ |
| 4 | {1,2,3,4}, {5,6,7,9,10,11,12,14} {5,9,10,11,12,14} {5,9,10,11,12,14,15} | $T_f$ |

FIG. 12

SYSTEM AND METHOD FOR DYNAMIC CODE ANALYSIS IN PRESENCE OF THE TABLE PROCESSING IDIOM

BACKGROUND

The embodiments herein relate to programming debugging, and more specifically, to methods and systems that use key-based dynamic slices to debug programs.

Ticket resolution is an important part of a service organization. Ticket resolution has two main implications. First, a client has discovered a bug in the field and so it needs to be resolved and fixed as fast as possible. Second, the bug has arisen despite the fact that the code has been well tested and probably been running in the field for some time. That means it is probably a corner case in otherwise correct code. Since speed is of the essence, it is important to have good tooling support that can help the programmer debug the program as fast as possible. This is especially true when the person who is debugging the code is not the programmer who has written the code, and hence is not familiar with the code.

SUMMARY

An exemplary method herein (that is also operated on a computerized device) receives an indication that a computer program, which interacts with relational database tables, is producing an incorrect value. The computer program comprises a plurality of lines of programming code, and logical loops. One line of the code (e.g., an "identified" write line of the programming code) outputs the incorrect value. In view of this, the method executes the computer program to produce a trace of the computer program. The trace includes at least a listing of each line of programming code that was executed, a name of each field, and a value of each field produced by each line of programming code executed.

This exemplary method divides the trace into independent threads of execution using the computerized device. Each of the independent threads of execution comprises an execution sequence of the lines of programming code that ends with the identified write line of programming code. This method also identifies at least one key field within each of the independent threads of execution. In programming, that is processing records in a table one by one, key-fields are a subset of the fields of the table. The key fields impact the computation sequence leading up to the identified write line of the programming code. Further, this method identifies key-based dynamic slices from the independent threads of execution, each of the key-based dynamic slices includes lines of programming code that are used in computations processing the table records corresponding the key fields.

This method continues and identifies at least one faulty key-based dynamic slice that outputs an incorrect value when executing the identified write line of programming code, and also identifies good key-based dynamic slices that output a correct value when executing the identified write line of programming code (using the computerized device). This method then determines differences between the faulty key-based dynamic slice and the good key-based dynamic slices using the computerized device to identify at least one potential fault area of the faulty key-based dynamic slice. Thus, this method can compare lines of programming code within the potential fault area with known error patterns using the computerized device to produce repair suggestions. These repair suggestions are then output from the computerized device.

Another exemplary method herein (that is also operated on a computerized device) receives an indication that a computer program, which interacts with relational database tables, is producing an incorrect value. The computer program comprises a plurality of lines of programming code, and logical loops. One line of the code (e.g., an "identified" write line of the programming code) outputs the incorrect value. In view of this, the method executes the computer program (by repeating different ones of the lines of programming code in different sequences according to logical loops within the computer program) using the same fault-inducing input, to produce a trace of the computer program. The trace includes at least a listing of each line of programming code that was executed, a name of each field, and a value of each field produced by each line of programming code executed.

This exemplary method divides the trace into independent threads of execution using the computerized device. Each of the independent threads of execution comprises an execution sequence of the lines of programming code that ends with the identified write line of programming code. This method also identifies at least one key field within each of the independent threads of execution. The key fields impact the identified write line of the programming code. Further, this method identifies key-based dynamic slices from the independent threads of execution, each of the key-based dynamic slices only includes lines of programming code that use the key fields.

This method continues and identifies at least one faulty key-based dynamic slice that outputs an incorrect value when executing the identified write line of programming code, and also identifies good key-based dynamic slices that output a correct value when executing the identified write line of programming code (using the computerized device). This method then normalizes the key-based dynamic slices into normalized key-based dynamic slices using the computerized device by representing portions of the execution sequences that are repeated as single execution sequence instances within the normalized key-based dynamic slices. This allows this method to merge ones of the normalized key-based dynamic slices that have the same pattern of single execution sequence instances (using the computerized device) to classify the key-based dynamic slices into the equivalence classes.

With the key-based dynamic slices classified into the equivalence classes, the method determines differences between the faulty key-based dynamic slice and the good key-based dynamic slices using the computerized device to identify at least one potential fault area of the faulty key-based dynamic slice. Thus, this method can compare lines of programming code within the potential fault area with known error patterns using the computerized device to produce repair suggestions. These repair suggestions are then output from the computerized device.

A system embodiment herein comprises a computerized device receiving an indication that a computer program which interacts with relational database tables is producing an incorrect value. The computer program comprises a plurality of lines of programming code, wherein an identified write line of the programming code outputs the incorrect value. The computerized device executes the computer program to produce a trace of the computer program. The trace comprises a listing of each line of programming code executed, a name of each field, and a value of each field produced by each line of programming code executed. The computerized device divides the trace into independent threads of execution. Each of the independent threads of execution comprises an execution sequence of the lines of programming code that ends with the identified write line of programming code.

A dynamic slicer identifies at least one key field within each of the independent threads of execution. In programming, that is processing records in a table one by one, key-fields are a subset of the fields of the table. The key fields impact the computation sequence leading up to the identified write line of the programming code. The dynamic slicer identifies key-based dynamic slices from the independent threads of execution. Each of the key-based dynamic slices includes lines of programming code that are used in computations processing the table records corresponding to the key fields. The computerized device identifies at least one faulty key-based dynamic slice that outputs an incorrect value when executing the identified write line of programming code, and the computerized device identifies good key-based dynamic slices that output a correct value when executing the identified write line of programming code.

An equivalence classifier normalizes the key-based dynamic slices into normalized key-based dynamic slices by representing portions of the execution sequences that are repeated as single execution sequence instances within the normalized key-based dynamic slices. The equivalence classifier merges ones of the normalized key-based dynamic slices that have the same pattern of single execution sequence instances using the computerized device to classify the key-based dynamic slices into the equivalence classes.

A fault localizer determines (with the key-based dynamic slices classified into the equivalence classes) differences between the faulty key-based dynamic slice and the good key-based dynamic slices to identify at least one potential fault area of the faulty key-based dynamic slice. The fault localizer compares lines of programming code within the potential fault area with known error patterns using the computerized device to produce repair suggestions, and the computerized device outputs the repair suggestions.

A non-transitory computer storage medium device embodiment is readable by a computerized device. The non-transitory computer storage medium device stores instructions that cause the computerized device to perform a method that receives an indication that a computer program, which interacts with relational database tables, is producing an incorrect value. The computer program comprises a plurality of lines of programming code, and logical loops. One line of the code (e.g., an "identified" write line of the programming code) outputs the incorrect value. In view of this, the method executes the computer program to produce a trace of the computer program. The trace includes at least a listing of each line of programming code that was executed, a name of each field, and a value of each field produced by each line of programming code executed. This exemplary method divides the trace into independent threads of execution. Each of the independent threads of execution comprises an execution sequence of the lines of programming code that ends with the identified write line of programming code. This method also identifies at least one key field within each of the independent threads of execution. In programming, which is processing records in a table one by one, key-fields are a subset of the fields of the table. The key fields impact the computation sequence leading up to the identified write line of the programming code. Further, this method identifies key-based dynamic slices from the independent threads of execution, each of the key-based dynamic slices includes lines of programming code that are used in computations processing the table records corresponding to the key fields.

This method continues and identifies at least one faulty key-based dynamic slice that outputs an incorrect value when executing the identified write line of programming code, and also identifies good key-based dynamic slices that output a correct value when executing the identified write line of programming code. This method then determines differences between the faulty key-based dynamic slice and the good key-based dynamic slices to identify at least one potential fault area of the faulty key-based dynamic slice. Thus, this method can compare lines of programming code within the potential fault area with known error patterns to produce repair suggestions. These repair suggestions are then output.

BRIEF DESCRIPTION OF THE SEVERAL VIEWS OF THE DRAWINGS

The embodiments will be better understood from the following detailed description with reference to the drawings, which are not necessarily drawing to scale and in which:

FIG. 1 is a sample program;
FIG. 2 is a table showing data in tables tab and slab;
FIGS. 3A and 3B are data slices of the execution trace;
FIG. 4 is a table illustrating equivalence classes of statements;
FIG. 5 is a sample program;
FIG. 6 is a basic syntax;
FIG. 7 is a table showing input and out for the program illustrated in FIG. 1;
FIG. 8 illustrates a slicing method chain;
FIGS. 9A and 9B illustrate a key based slicing;
FIG. 10 is a chart illustrating different threads of execution into trace equivalence;
FIG. 11 is a chart illustrating trace normalization;
FIG. 12 is a chart illustrating computing equivalence classes.

DETAILED DESCRIPTION

Figure 13:
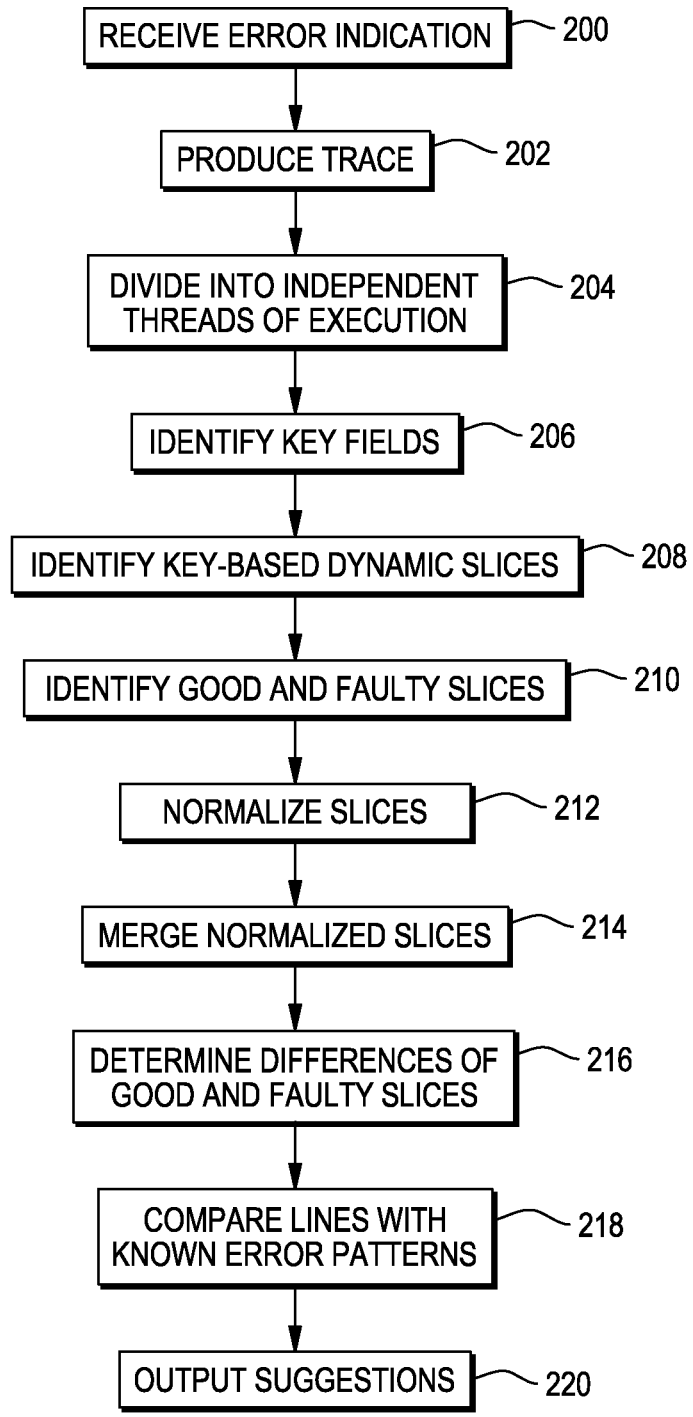
FIG. 13 is a flowchart illustrating an embodiment herein.

ABAP (Advanced Business Application Programming) is a high-level programming language that SAP provides to customize its packaged applications. One large class of ABAP programs concerns custom report generation, and this is the class of program that the embodiment focuses on. FIG. 1 shows a typical report generating program written in ABAP. It contains various statements to carry out operations on relational tables. Line 1 shows a SELECT statement, whose purpose is to project certain columns from a relational database table dbtab into tab, which is a table internal to the program. The field uid is the primary key. The SORT statement, not surprisingly, sorts the specified internal table on specified key (or keys). The DELETE ADJ statement eliminates rows from the specified table that contain same values of all the specific fields. The LOOP is an iterator over an internal table, reading one row at a time into the local record wa. The AT NEW predicate is true for a field name (generally the key field) when the field's value in the current record is different from the previously read record, if one exists; similarly for AT END. The READ statement at line 10 contains a join-like statement, matching a row from another table stab on the key value.

A defective ABAP program writes incorrect values for at least one key value. The problem resolution system works as follows. Given an ABAP program that has run incorrectly, one first translates it into instrumented Java code. The embodiments herein then compile the code and run it with the appropriate input values. The embodiments run a fault localization method on the dynamic trace generated.

In problem determination setting, one is often faced with the situation that only a failing run is available. The symptom of the failure is known, e.g., an output value is incorrect, but the cause is not known. The task of the programmer is to identify the cause (or the bug) in the program. It is assumed that the database on which the failing run executed is itself consistent, that is, it does not violate its own integrity constraints. This assumption is reasonable, because the same database typically feeds into several other applications that do work properly. Moreover, this is the setting that is common in a ticket resolution service organization.

The embodiments herein go about fault localization in the case in which a suite of passing runs is not available. The disclosure's insight is that handling of rows with some value x for a certain primary key is usually independent of other rows with a different value for the same primary key. As long as the failure symptom can be associated with a specific value for a specific primary key, the embodiments herein can use the execution sequence that pertains to this value in the specified primary key as a failing run, and the execution sequences that pertain to other key values as passing runs.

Thus, given a fault point in the ABAP program, the embodiments herein extract the relevant dynamic data slice for the given value at the given program point, by analyzing the trace generated from the execution of the corresponding Java program. Next, the embodiments herein find the paths through the collected data that had generated correct output at the same point of interest. Thereafter, the embodiments herein can, potentially, apply a standard fault localization technique to this setting.

More specifically, one exemplary method herein (that is operated on a computerized device) receives an indication that a computer program, which interacts with relational database tables, is producing an incorrect value. The computer program comprises a plurality of lines of programming code, and logical loops. One line of the code (e.g., an "identified" write line of the programming code) outputs the incorrect value.

In view of this, the method executes the computer program (by repeating different ones of the lines of programming code in different sequences according to logical loops within the computer program) using the same fault-inducing input, to produce a trace of the computer program. The trace includes at least a listing of each line of programming code that was executed, a name of each variable, and a value of each variable produced by each line of programming code executed.

This exemplary method divides the trace into independent threads of execution. Each of these independent threads of execution includes an execution sequence (also, sometimes referred to herein as an "execution trajectory") of the lines of programming code that ends with the identified output (e.g., write) line of programming code. The process of dividing the trace identifies at least one variable within the lines of programming code as a key variable, and each of the slices includes at least one line of programming code that uses at least one key variable. The key variables are sorting keys of the relational database tables.

The key-fields corresponding to the records being processed and output, are identified by the method, and used in computing a key-based dynamic slice for each of the independent threads of execution. The computed key-based dynamic slice has the execution instances of only those lines of programming code that impacted the output segment on which a fault has been observed. For the data-centric statements (e.g., read, sort, delete, select etc.) the method uses the key to judge whether with respect to that key the data-centric statement had any impact or not. For example, if a sort, or a delete statement, changed the position of the records with respect to a particular key in the table being operated upon but caused no change within the group of records associated to that key, then such a statement may not be considered as part of the key-based dynamic slice corresponding to that key.

The method also identifies at least one "faulty slice" that outputs the incorrect value when executing the identified write line of programming code, and identifies "true good slices" that output a correct value when executing the identified write line of programming code. The method then normalizes the slices using the computerized device by representing portions of the execution sequences that are repeated as single execution sequence instances within the normalized slices. The normalized slices are in execution sequence order at this point. Following this, the method performs a process similar to a "bag of nodes" classification, by merging the normalized slices that have the same pattern of single execution sequence instances, to classify the slices into the equivalence classes.

With the slices classified into the equivalence classes, the method then determines what differences exist between the key variables of the faulty slice and the key variables of the good slices, to identify at least one potential fault area of the faulty slice. The faulty slice maintains different values in the key variables from the true slices. Next, the method compares lines of programming code within the potential fault area of the faulty slice, with known error patterns (that are specific to the relational database tables) to produce repair suggestions, that are then output. The repair suggestions comprise suggested changes to the lines of programming code.

With respect to key-based fault localization, the following explains now with the help of a running example, the basic problem and the solution. Consider the sample ABAP program shown in FIG. 1. The program loops over the contents of tab (line 5), sums up the price (line 9), subtracts any relevant discount (line 12) and prints out the total (line 15). In this program, the symptom of the bug is that sometimes an incorrect value of sum is printed at line 15.

Consider the data shown in FIG. 2. The statement execution sequence for the given data is shown in FIGS. 3A and 3B. Note, that the drawings only show the relevant statements computed as the dynamic data slice. The implementation details of the dynamic data slice are shown below. There are five clearly discernible execution sequences that end at line 15:

$E_1$ Statements executed through loop iterations 0, 1, and 2, ending in print 1 33.0.

$E_2$ Statements executed through loop iterations 3, ending in print 2 13.0.

$E_3$ Statements executed through loop iterations 4, ending in print 3 14.0.

$E_4$ Statements executed through loop iterations 5, ending in print 4 13.0.

$E_5$ Statements executed through loop iterations 6, 7, and 8, ending in print 5 42.0.

Of these, only the fifth one generates an incorrect value, and the other four are valid.

With respect to equivalence classes, the embodiments herein find an appropriate classification that classifies clubs different sequences into equivalence classes such that the correct executions go into one class and the incorrect ones go into another. Three classifications are shown in FIG. 4. The first uses a simple sequence of nodes, resulting in four equivalence classes. $G_1$ contains the execution sequence $E_1$, $G_2$ contains $E_2$ and $E_3$ and the $G_3$ and $G_4$ contain $E_4$ and $E_5$ respectively.

The second classification uses a "bag of nodes" scheme that is equivalent to static slicing. This gives fewer groups, but in this example, this classification groups the correct execution sequence, $E_4$, with an incorrect execution sequence, $E_5$.

The third classification uses a combination of sequence of nodes and bag of nodes—sequencing loop iterations while merging consecutive iterations that have the same bag of nodes. This classification also generates 4 equivalence classes as shown in FIG. 4.

With respect to diagnosis, the embodiments herein find the classification that 1) isolates the incorrect execution(s); and 2) that has the smallest number of equivalence classes. In the example above, classification 2 gets eliminated by rule (i) Classification 1 and 3 both have four equivalence classes. However, though it may not be obvious from the current example, Classification 1 actually has a potentially unbounded number of equivalence classes. Hence, this classification is generally used as a "fallback" in case all else fails. In the unusual event that even the first classification fails to isolate the faulty sequences, the embodiments herein conclude that there is a problem with the input data. Applying classification 3 to the example, the embodiments herein get the difference between $G_1/G_2$ and $G_4$ to determine that the statements 10, 11 and 12 are potential sources of the bug. The difference between $G_3$ and $G_4$ indicates that the error occurs when the number of iterations exceeds one.

With respect to Heuristics based repair, based on programmer's experience, there are many guidelines to add, delete, or tweak certain database commands, in order to find the exact repair for the program. The embodiments herein make the change in the original ABAP program, and then run through the cycle of converting it to Java, compiling and executing the program again for each suggested repair.

In this case, it is known that the final sum is smaller than anticipated. The embodiments herein need to increase the final value. In order to increase the final sum, the embodiments herein can first increase the number of iterations: (a) remove the DELETE ADJ DUP; (b) change DELETE ADJ DUP the parameters, so that it deletes less records, or second, the embodiments herein can reduce the discount subtracted (a) add a command to delete the discount after it is used once; or (b) reduce the discount by multiplying it by some fixed fraction.

These suggestions are automatically generated by the analysis. Currently, the programmer manually weeds out the non-viable options and makes the suggested changes in the ABAP program. Then, the system takes over and automatically runs the program, compares the results and possibly suggests new options. The programmer can then decide whether to accept the solution or not.

With respect to actual solution, although option 2(b) gives the correct results on the sample input, it so happens that none of the suggested repairs is the correct solution. It turns out that the discount coupon was for the total purchase and should not have been inside the loop. The discount coupon could be used twice in a period of a month which is why it was not acceptable to delete it arbitrarily. The lines 10 through 12 were moved inside the AT END block in the final corrected code. Although this did not diagnose this kind of repair, the programmers find the suggestions useful. The embodiments herein are able to handle many others as will be show in the rest of the disclosure.

With respect to contributions, in order to derive this kind of information, there are several challenges that need to be resolved, some of which are listed below: how to recognize which is the primary key(s) to associate with an execution sequence?; how to extract the sequences of execution, which may have potentially overlapping statements?; how to classify the sequences into meaningful equivalence classes that can give the programmer insight into the problem? etc.

Additionally, there is the challenge of converting an ABAP program into Java. Converting to Java gives the advantage of using standard tools for analysis that are typically not available for a proprietary language like ABAP. In addition to the fault localization method described in this disclosure, the embodiments herein also run the generated code through standard Java static analysis tools.

With respect to fault localization in ABAP, the embodiments herein give the technical details of the fault localization method. This works in three steps: 1) compute the dynamic slice (a) locate the starting and the related starting points; (b) dynamic control dependence (c) dynamic data dependence (d) dynamic slice, 2) generate equivalence classes, 3) fault localization (a) diagnosis (b) repair.

Figure 14:
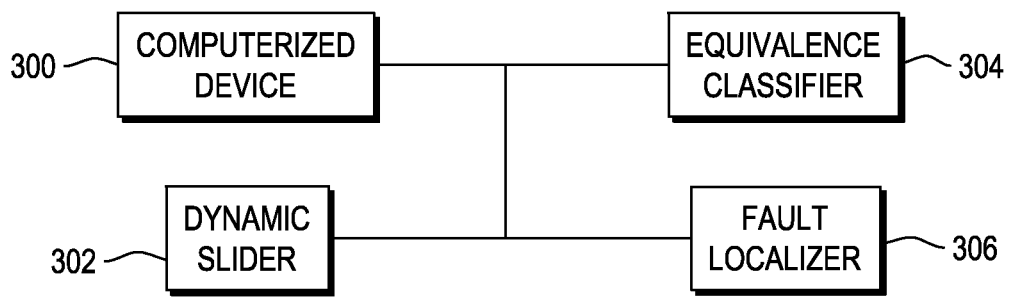
FIG. 14 is a schematic diagram of an embodiment herein.

This disclosure also describes some of the language specific patterns the embodiments apply to get some additional diagnostics. To illustrate the various concepts, the embodiments use the ABAP program shown in FIG. 1. This program was converted into Java and executed. FIG. 14 shows a highly condensed version of the trace generated.

With respect to computing the dynamic slice, the embodiments herein generate a dynamic backward slice which is computed from the dynamic trace as the transitive closure of combined dynamic data and control dependences of a starting statement.

In starting point and dynamic traces, as mentioned in the previous section, the embodiments herein generate "instrumented" Java code which when executed dumps a dynamic trace. For each statement that gets executed the trace includes the line number of the original ABAP statement, the names of each variable used or defined, and the value of each variable defined. The variable can be a simple scalar, a structure with at least one field, or a table with zero or more rows of a given structure. Typically, (though not always) a field of a structure in a table is a scalar. Along with the trace, the embodiments herein also dump information pertaining to the symbol table and the various types used.

Given an input sequence and the corresponding faulty output, the embodiments herein first locate the statement $S_{fwhich}$ prints the faulty output. The embodiments herein go through the dynamic trace and every instance of $S_f$ is treated as an independent starting point. From each starting point, the embodiments herein generate a dynamic backward slice which is computed from the dynamic trace as the transitive closure of combined dynamic data and control dependences of $S_f$.

The set of dynamic traces corresponding to these starting points is represented by $T_{tf}$. Each trace has a starting point somewhere in the program, and ends with a print statement.

The set of traces for which the final print statement result in an incorrect output is denoted by $T_f \subseteq T_{tf}$. The set of correct traces is given by $T_t = T_{tf} - T_f$.

With respect to dynamic control dependence, the Java code is instrumented to dump a marker at the beginning and at the end of each block (conditionals, loops, functions and so on). For example, for an if statement, the embodiments herein add a marker at both the then block as well as the else block (if it exists). The embodiments herein add a marker at the natural end as well as at any forced end (such as break, continue) of the block. When the instrumented Java program is executed, the appropriate start and end markers go into the trace.

Once the markers are in place, computing the dynamic control dependence is a stack based method. The embodiments herein push a start program token onto an empty stack. Then, the embodiments traverse the trace from the first statement to the last. Whenever the embodiments encounter the block start token, the embodiments push it on the stack and pop it when the embodiments encounter the corresponding end block token. A statement is control dependent on the conditional statement at the top of the stack.

When handling specific database commands, the ABAP commands AT NEW and AT END behave like conditionals. If one were to look at it from a purely Java perspective, the command AT END field translates to

```
if cursor == itab.nrows then return true;
    end
    if itab[cursor].field/= itab[cursor+1].field then
        return true;
    end
    return false.
```

Here, itab is the table on which the program is looping and cursor is the loop counter. From a code analysis perspective, this implies a loop carried dependence and makes the analysis unnecessarily complicated. Instead, the embodiments herein break this into two much simpler concepts: that the data is sorted (or at least grouped by) field, and the embodiments generate the simple predicate itab [cursor].field=value, where value is obtained from the dynamic trace. Thus, the embodiments herein generate two constraints: 1) the table must be sorted on field; and 2) the field must contain "value" to be pertinent to this execution trace. The first constraint gets evaluated in the course of the analysis and is reported as a bug if the table is not sorted on the appropriate fields. The second constraint may be used to refine the slice as described in the next paragraph.

With respect to dynamic data dependence, as in the case of control dependence, the basic method for computing dynamic data dependence is standard. However, when the embodiments come to database commands, then the embodiments do better than the standard. Consider the code in FIG. 1, the delete adjacent duplicates command deletes only those rows where the field vbeln hsd s value "abc". That is, it affects only the field vbeln when its value is "abc" and hence, is part of the execution thread that pertains to the key value pair <vbeln, abc> and not to the key value pair <vbeln, def>. This kind of analysis helps pin-point the source of the bug.

With respect to Computing the Dynamic Slice, the following is presented:

```
T = ((S_n));
Ct=S_n .CD( );
Sym = S_n . useSym( );
For each j = seq; j>0; j-do
|    s = Dump.get(j);
|    if s.defines (Sym) then
| |      T = T ∪ s;
| |      Sym – sym – s;
| —
|    if valid (Ct, s.pred) then
|       if s.controls (T) then
|   |      T = T ∪ s;
|   —      Ct = Ct + s.pred;
—
    Sym = s.useSym( );
    if s.is DBCommand ( ) then
|       handleSpecial(s);
—
—
```

Method 1: Method to Compute the Dynamic Slice

The method shown above has the following components. Starting at each start statement $S_n$, the embodiments herein determine that the control dependence conditions. All conditions that $S_n$ is transitively dependent on are added to a set Ct. Any condition that pertains to a table value is added to a list of table constraints. Symbols that are being used are added to a symbol-set Sym.

If the statement defines any symbol lhs=rhs, replace rhs by lhs in symbolset and in every constraint. Add the statement to the slice T=T∪s. If the statement is of the form lhs=rhs+rhs' then from the dynamic trace dump, first obtain the value of rhs' and substitute lhs–rhs' in all the constraints. Since the embodiments herein are working with real values in a dynamic trace, they do not need a constraint solver.

If the statement S is a conditional and does not conflict with a condition in Ct, and there is at least one statement collected so far, in T that is either directly or indirectly control dependent on S, then add the statement to the slice T=T∪s. For specific database commands, the embodiments herein apply command-specific rules to determine whether to include in the slice or not.

FIG. 5 shows a sample program written in ABAP and FIG. 6 explains the syntax of each of the commands. This program represents a business application that creates a report of orders placed by different customers.

With respect to key based slicing, it may appear that one can always generate faulty and good slices and potentially, apply a differencing technique to this setting. However, this is not always the case as the dynamic slice based on simple data and control dependence may not differentiate between a correct and an incorrect execution slice. Consider the bug reported for same sample program in (a) of FIG. 7. In this case, the end-user was expecting to see the amount value as 18.0 for CustId=1. However, the code is deleting all order records that are older than 2 years (line 5). This means the delete statement in Line 5 is incorrect or incomplete (as one assumes end-user expectation and data in the input source is correct). The slices for both the output rows are same as shown in (b) of FIG. 7 and hence differencing will not be able to identify any faulty lines. The embodiments herein resolve this by enhancing the existing dynamic slicing with the introduction of a key in the slicing predicate. The intuition for this is as follows. Usually in a data centric program, as part of the output record, one writes out an input field that acts as the identifier (or key) for the data and is unchanged from the input to output. For the example, this field is the CustId. Besides using an execution of a particular statement as the predicate for the slice, the embodiments herein also use the value of this key field as the slicing criterion. Item (c) of FIG. 7 shows the key based slices. Line 5 is only showing a side-effect for records in OrderTab with CustId=1. The values in the table itab before (Pre) and after statement #5 (Post) are given below

| itab(Pre) | | | | itab(Post) | | | |
|---|---|---|---|---|---|---|---|
| CustId | ItemId | Price | Year | CustId | Item Id | Price | Year |
| 1 | I1 | 10.0 | 2009 | 1 | I2 | 10.0 | 2011 |
| 1 | I2 | 10.0 | 2011 | 2 | I3 | 10.0 | 2011 |
| 2 | I3 | 10.0 | 2011 | | | | |

Once the embodiments herein do a differencing on these key based slices, the technique highlights line 5 as the potential fault inducing code, as it effects the faulty slice, and not the correct slice.

As discussed in the previous section, the row and field sensitive slicing method discussed before can result in imprecise slices. An important question to answer is, when does a statement occurrence is part of the slice? In the application, as dynamic slices are representative of the computation that affects the rows in the output, then a statement is not part of the slice if absence of it does not have any effect in the computation of the variable values in the output row associated to the slice. In the above example the delete statement does not have any effect in computing the amount value in the second row. Here, the embodiments note one important assumption. If a statement occurrence only affects the position of a row in the output, and not the variable values specified in slicing criteria in the row, the statement is not part of the slice. For example, if a variation of the delete statement deleted all the rows related to CustId=1, which would have shifted the second output row to first, even then the delete statement is considered to be not part of the slice corresponding to the second row. Many times the respective order of rows in the output is not important; as the embodiment has found in the experience it is rare to find bugs related to the order of rows in the output, instead the bug is found in the content of the row.

To determine whether a statement occurrence is affecting the variables values in the slicing criteria, the embodiments herein need to check two conditions: (C1) if the statement occurrence is performing any operation which defines a variable in the dependency set, (C2) if the statement can effect the dependency set itself in terms of addition or deletion of elements. If any one of the condition C1 and C2 is true, the statement is added to the slice. For example, the delete statement in the running example does not satisfy the condition C1 for the slices corresponding to both the rows of the output, but satisfies C2 for the first row, and not for the second row. Checking condition C1 is relatively easier than checking C2 for statements that operate on tables.

In this disclosure, sufficient criteria is presented to check the condition C2. The main aim of the criteria is to try to remove a statement from the slice which otherwise would be included by the basic row-sensitive method. One idea of the method is to associate a set of key-value pairs with the slicing criteria, such that, the selection of the elements to compute the variable values specified in slicing criteria can be identified by the key-value pairs. In this example, it is evident that the slice with respect to the criteria $<16^{28}, \{amount\}>$ and $<16^{15}, \{amount\}>$ have association with key-value pair $<CustId, 2>$, $<CustId, 1>$ respectively.

With this association, whether to include the statement occurrence $5^4$ can be checked by determining whether the deleted rows match the key-value pairs. Thus, a row r matches a key-value pair (k, v), if the value of key k in row r is equal to v. In general, a statement is included in the slice if any change performed by the statement (such as added, deleted, or updated rows) matches the key-value pairs.

Along with the key-value pair conditions, the embodiments herein associate sequence conditions which state that elements that are used to compute the variables in slicing criteria are in adjacent rows in an internal table. This is particularly useful to express group-by constraint in database operation. Consider the example pre-state of the delete statement $5^4$.

| itab(Pre) | | | | itab(Post) | | | |
|---|---|---|---|---|---|---|---|
| CustId | ItemId | Price | Year | CustId | Item Id | Price | Year |
| 1 | I1 | 10.0 | 2009 | 1 | I2 | 10.0 | 2011 |
| 2 | I1 | 5.0 | 2009 | 2 | I3 | 10.0 | 2011 |
| 1 | I2 | 10.0 | 2011 | | | | |
| 2 | I3 | 10.0 | 2011 | | | | |

Here, the delete statement does not affect the slicing criteria $<16^{28}, \{amount\}>$ given this assumption of unimportance of position of output row. In this case, the delete statement performs a change that is satisfied by key-value constraint as one of the deleted row has CustId=2, but the change does not satisfy the key-value condition and the sequence condition together, as the deleted row is not adjacent to the rows in the dependency set and therefore will not be in the sequence for further selection. There are multiple ways to identify key-fields for association. The key-fields can be specified by the user. This is not an unrealistic assumption in the context of fault localization, as the embodiment can observe many of the bug reports contained this information. Fields in the internal table that are not modified before being written out into the output. Fields in the internal table that are used to operate on the rows (select, delete, modify, and so on).

However, the embodiments herein use the key-value and sequence based conditions to filter out a statement from slice, under the condition that both key condition and sequence condition hold in the existing element in the dependency set. The disclosure refers to them as the key-value assumption and sequencing assumption. Thus, checking of these assumptions is required and if the assumption is violated then appropriate approximation is chosen based on the chain provided in FIG. 7. As one goes up in the chain in FIG. 8, the slice gets more precise with increase overhead of computation.

A key-based slicing method is presented in FIGS. 9A and 9B. Statements 1-6, 8-11, 16-17, 20-22 represent a basic field and row sensitive dynamic data slicing method. The function get_def_use (s) returns a set of def-use pairs representing def-use relationship between each pair. It is assumed that function field_row_sensitive_inclusion_check performs the necessary checks like nonempty intersection of dependence set and defs in duSet to check data dependency and control dependency to include a statement occurrence in the slice. Once a statement is identified to include in the slice, the dependency set is updated by removing the def and including use of each def-use pair in duSet [Line 17]. Above the check done by field-row sensitive check, the embodiments herein add the key-value and sequence checking to determine whether a statement occurrence chosen by the basic field-row sensitive method will be part of the slice. These checks are only done for statements that work on tables. The function check_key_assumption checks that the all non-scalar elements in the dependency set satisfied the key-value pairs, and function check_sequence_assumption checks that all the elements in the dependency set are in sequence, so that any statement occurrence which has a change outside this sequence will not have any effect for a particular key value.

Note, that to highlight the interesting part of the method, this disclosure does not present the slicing method in terms of dynamic dependence graph, used to express the data and control dependencies in execution trace. Also, it is possible to give a necessary and sufficient condition to check the condition C2. However, evaluation of such condition is not scalable, and thus not ideal for practical purpose. This disclosure therefore, restricts the presentation to the practical and scalable technique of key-based slicing.

With respect to fault localization, the embodiments herein try to find the potential source of bugs, and then apply some heuristics to suggest possible repair scenarios. As already explained in the previous sections, one idea here is to classify the different threads of execution into trace equivalence classes. The embodiments find a different set between sets of $T_f$ and $T_t$ to narrow down on the possible sources of bugs. Here, this disclosure describes in detail the classification that accounts for loops. Consider the same example, but with an extra iteration occurring in Execution thread number 5, as shown in FIG. 10.

Trace Normalization is shown in FIG. 11. Any sequence of statements repeated two or more times is summarily represented by a single instance of execution. The set of normalized traces for the input program 1 is shown (statement numbers between two markers are shown as sets).

Computing equivalence classes is shown in FIG. 12. Given the sets $T_f$ and $T_t$ of traces the embodiment now reduces the number of elements in these sets by first computing equivalent traces and then merging them. For the input program 1, the embodiment merges the second and the third trace into one thus resulting in total three traces in $T_t$.

With respect to repairs, the first and more obvious suggestions to repair are based on the standard patterns related to sorting database tables based on constraints such as DELETE ADJACENT DUPLICATES must be preceded by a sort on the same set of fields. AT END and AT NEW need to be preceded by a sort. Another is to check the value of the system variable subrc after a READ/SELECT. There is a long laundry list of similar items, some of which are related to performance issues such as No SORT/SELECT inside a loop, No BINARY-SEARCH in READ statement, and Single vs Up to 1 row in select statement.

Since this deals only with reports, the faults are either that a value is too big or too small. Based on the experience of ABAP programmers, a configurable list of repairs has been built to reduce or to increase the total sum for a given execution trace that has been reported to be faulty. To decrease the total value, one can decrease the number of iterations, add a delete command or narrow the scope of an existing delete, add constraints to a select, decrease the value computed, apply an appropriate multiplier to the data, apply delete after a READ (this may expose fresh data), or apply an increase to data that is being subtracted from the total. The rules to increase the total value are symmetrical.

FIG. 13 is a flow diagram illustrating various aspects of method embodiments herein. More specifically, FIG. 13 illustrates a method that is also operated on a computerized device. In item 200, the method receives an indication that a computer program, which interacts with relational database tables, is producing an incorrect value. The computer program comprises a plurality of lines of programming code, and logical loops. One line of the code (e.g., an "identified" write line of the programming code) outputs the incorrect value.

In view of this, in item 202 the method executes the computer program (by repeating different ones of the lines of programming code in different sequences according to logical loops within the computer program) using the same fault-inducing input, to produce a trace of the computer program. The trace includes at least a listing of each line of programming code that was executed, a name of each field, and a value of each field produced by each line of programming code executed. The computer program produces the incorrect value using some input values (e.g., fault-inducing input) and the process of executing the computer program to produce the trace also uses the same fault-inducing input.

This exemplary method divides the trace into independent threads of execution using the computerized device in item 204. Each of the independent threads of execution comprises an execution sequence of the lines of programming code that ends with the identified write line of programming code. This method also identifies at least one key field within each of the independent threads of execution in item 206. The key fields comprise sorting keys of the relational database tables. The key fields impact the identified write line of the programming code. Further, this method identifies key-based dynamic slices from the independent threads of execution in item 208, each of the key-based dynamic slices only includes lines of programming code that processes the record corresponding to the key fields.

This method continues and identifies at least one faulty key-based dynamic slice that outputs an incorrect value when executing the identified write line of programming code, and also identifies good key-based dynamic slices that output a correct value when executing the identified write line of programming code (using the computerized device) in item 210. The faulty key-based dynamic slices maintain different values in the key fields from the good key-based dynamic slices.

This method then normalizes the key-based dynamic slices into normalized key-based dynamic slices using the computerized device in item 212 by representing portions of the execution sequences that are repeated as single execution sequence instances within the normalized key-based dynamic slices. This allows this method to merge ones of the normalized key-based dynamic slices that have the same pattern of single execution sequence instances (using the computerized device) to classify the key-based dynamic slices into the equivalence classes in item 214.

With the key-based dynamic slices classified into the equivalence classes, the method determines differences between the faulty key-based dynamic slice and the good key-based dynamic slices using the computerized device to identify at least one potential fault area of the faulty key-based dynamic slice in item 216. Thus, this method can compare lines of programming code within the potential fault area with known error patterns using the computerized device to produce repair suggestions in item 218. The known error patterns are specific to the relational database tables, and the known error patterns comprise statically known idiom specific patterns whose existence/absence is known to result in error with a predetermined high probability. The repair suggestions are suggested changes to the lines of programming code. These repair suggestions are then output from the computerized device in item 220.

A system embodiment is schematically illustrated in FIG. 14. This exemplary system embodiment includes a computerized device 300 receiving an indication that a computer program which interacts with relational database tables is producing an incorrect value. The computer program comprises a plurality of lines of programming code, wherein an identified write line of the programming code outputs the incorrect value. The computerized device 300 executes the computer program to produce a trace of the computer program. The trace comprises a listing of each line of programming code executed, a name of each field, and a value of each field produced by each line of programming code executed. The computerized device 300 divides the trace into independent threads of execution. Each of the independent threads of execution comprises an execution sequence of the lines of programming code that ends with the identified write line of programming code.

A dynamic slicer 302 identifies at least one key field within each of the independent threads of execution. The key fields impact the identified write line of the programming code. The dynamic slicer 302 identifies key-based dynamic slices from the independent threads of execution. Each of the key-based dynamic slices includes ones of the lines of programming code that use the key fields.

The computerized device 300 identifies at least one faulty key-based dynamic slice that outputs an incorrect value when executing the identified write line of programming code, and the computerized device 300 identifies good key-based dynamic slices that output a correct value when executing the identified write line of programming code.

An equivalence classifier 304 normalizes the key-based dynamic slices into normalized key-based dynamic slices by representing portions of the execution sequences that are repeated as single execution sequence instances within the normalized key-based dynamic slices. The equivalence classifier 304 merges ones of the normalized key-based dynamic slices that have the same pattern of single execution sequence instances using the computerized device 300 to classify the key-based dynamic slices into the equivalence classes.

A fault localizer 306 determines (with the key-based dynamic slices classified into the equivalence classes) differences between the faulty key-based dynamic slice and the good key-based dynamic slices to identify at least one potential fault area of the faulty key-based dynamic slice. The fault localizer 306 compares lines of programming code within the potential fault area with known error patterns using the computerized device 300 to produce repair suggestions, and the computerized device 300 outputs the repair suggestions.

As will be appreciated by one skilled in the art, aspects of the embodiments herein may be embodied as a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in at least one computer readable medium(s) having computer readable program code embodied thereon.

Any combination of at least one computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments herein may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments herein are described below with reference to flowchart illustrations and/or block diagrams of methods, apparatus (systems) and computer program products according to embodiments herein. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
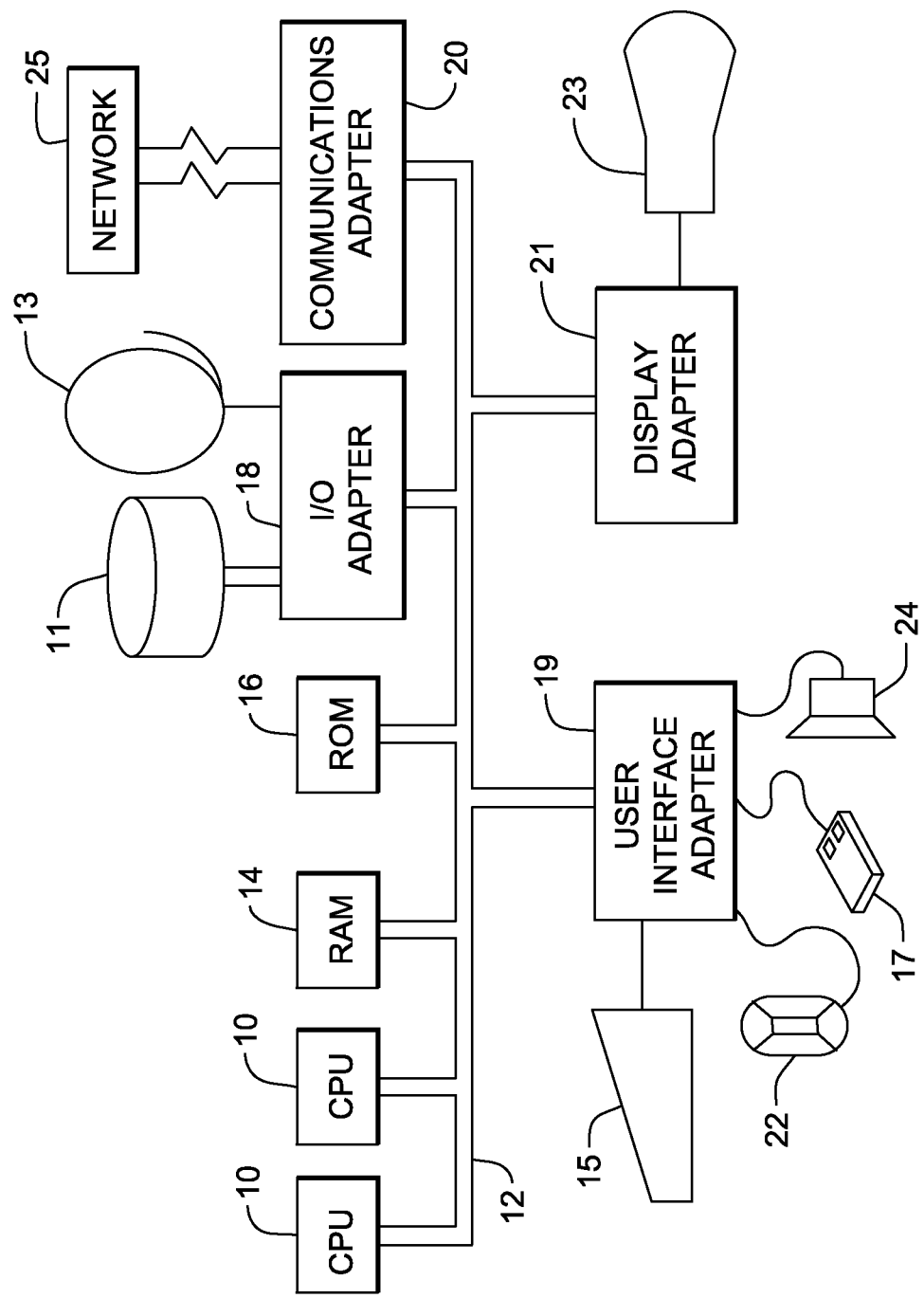
FIG. 15 is a schematic diagram illustrating an exemplary hardware environment that can be used to implement the embodiments herein.

A representative hardware environment for practicing the embodiments herein is depicted in FIG. 15. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the figures illustrate the architecture, functionality, and operation of possible implementations of systems, methods and computer program products according to various embodiments herein. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 16:
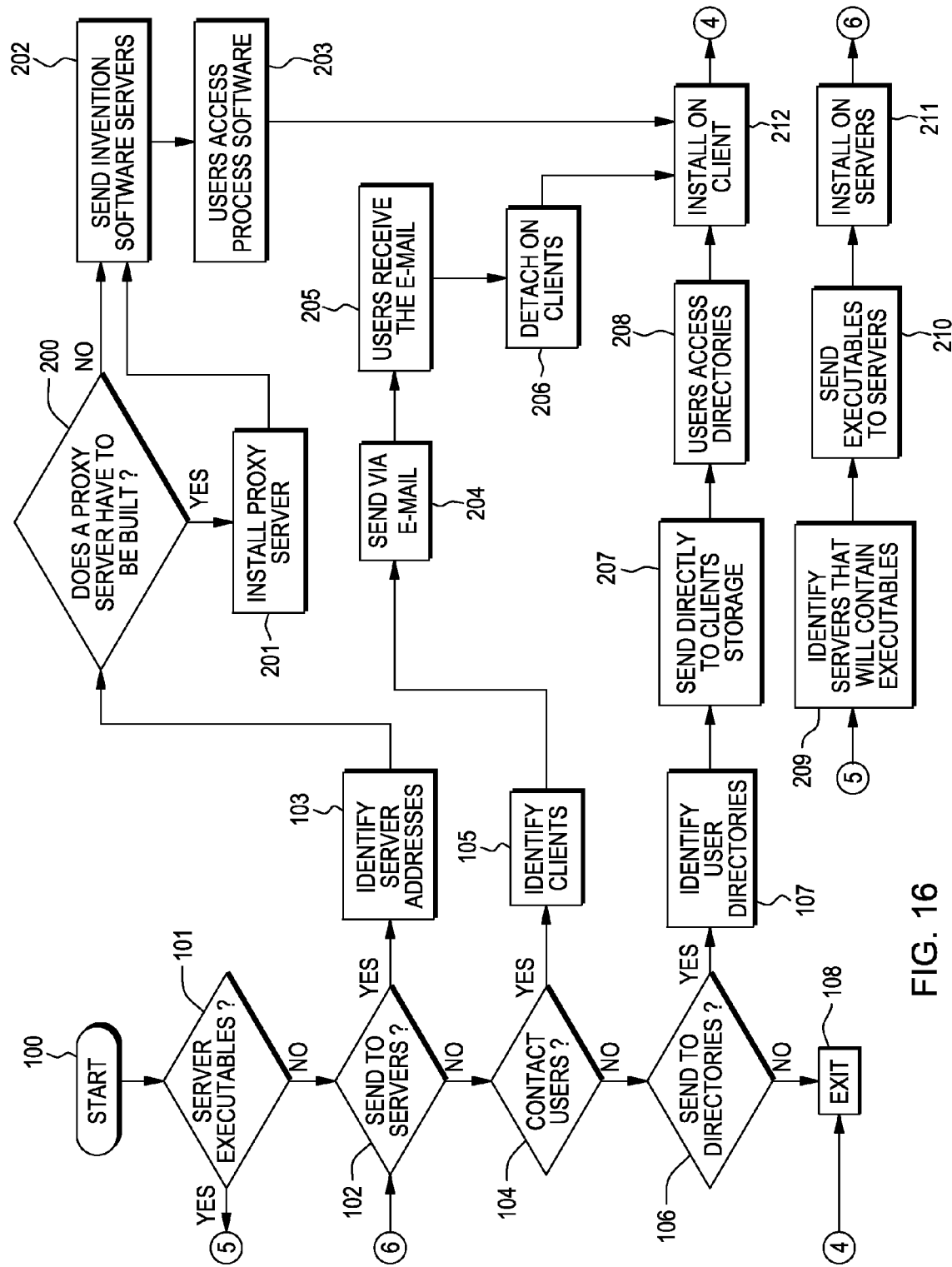
FIG. 16 is a flow diagram of a design process used in semiconductor design, manufacture, and/or test.

In FIG. 16, step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211. Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

Figure 17:
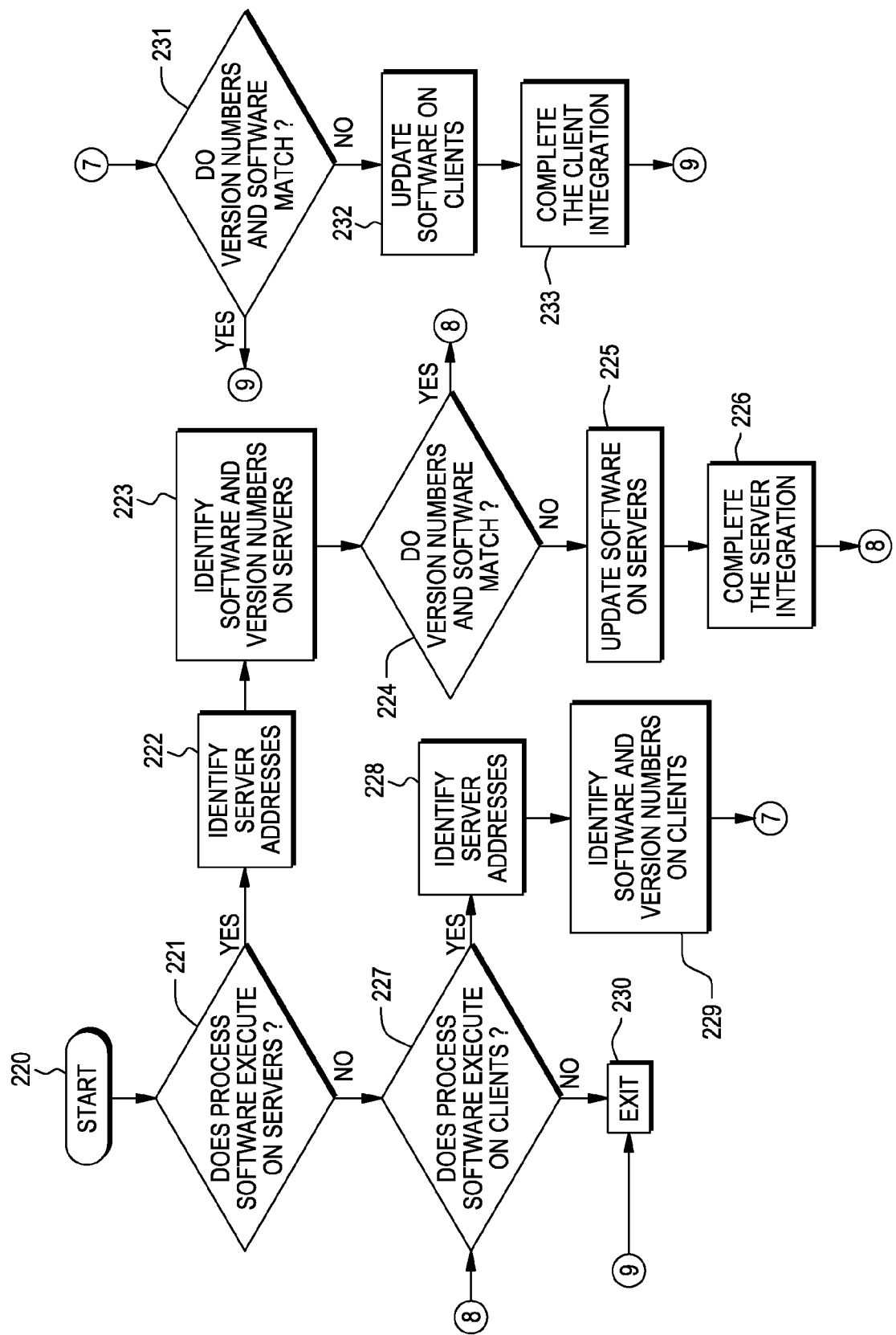
FIG. 17 is a flow diagram of a design process used in semiconductor design, manufacture, and/or test.

In FIG. 17, step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If at least one of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228. The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits. If at least one of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

Figure 18:
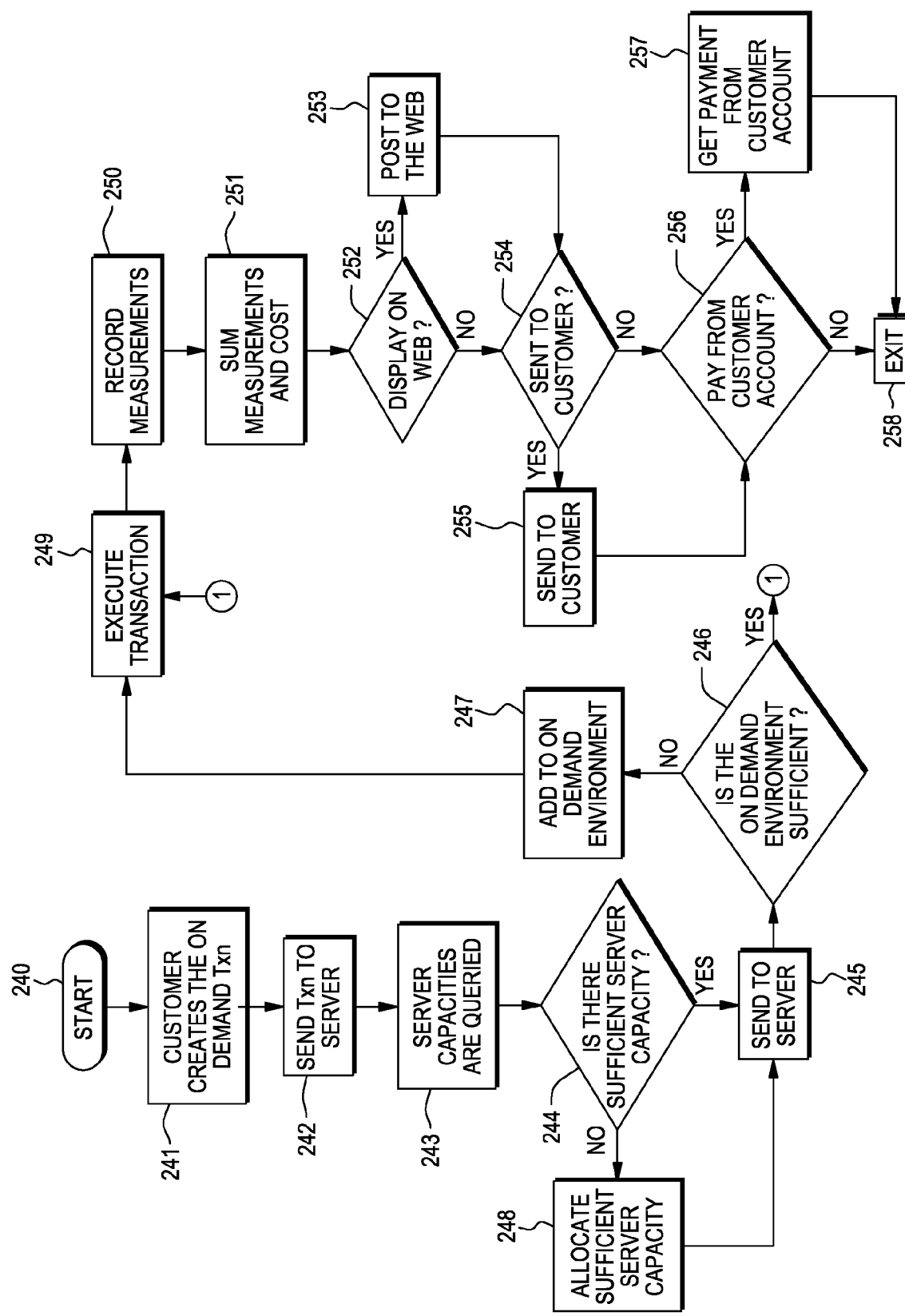
FIG. 18 is a flow diagram of a design process used in semiconductor design, manufacture, and/or test.

In FIG. 18, step 240 begins the On Demand process. A transaction is created than contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit 258 the On Demand process.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 19:
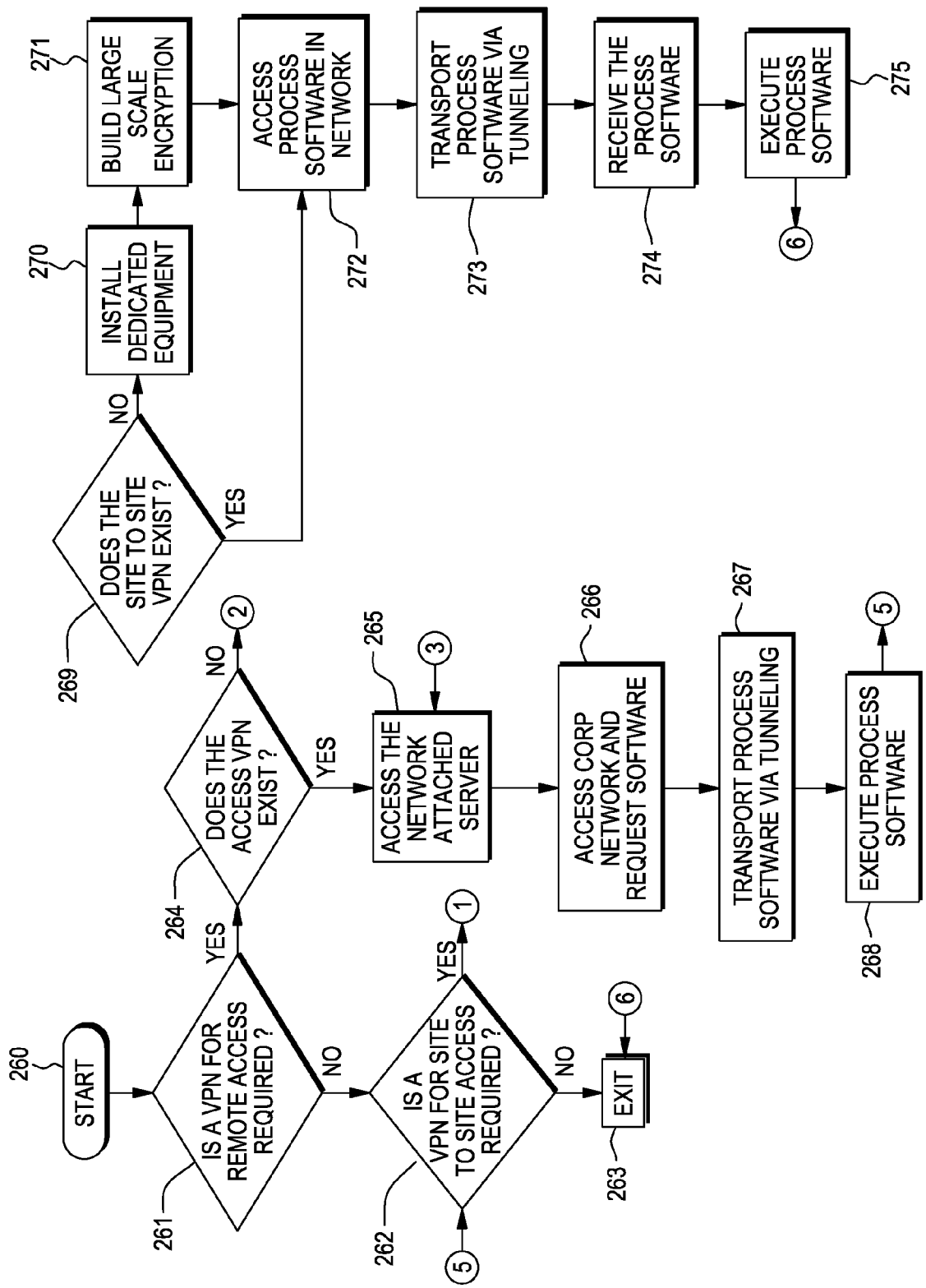
FIG. 19 is a flow diagram of a design process used in semiconductor design, manufacture, and/or test.

In FIG. 19, step 260 begins the Virtual Private Network (VPN) process. A determination is made to see if a VPN for remote access is required 261. If it is not required, then proceed to 262. If it is required, then determine if the remote access VPN exists 264. If it does exist, then proceed to 265. After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then, build the large scale encryption into the VPN 271.

After the site to site VPN has been built or if it had been previously established, the users access the process software via the VPN 272. The process software is transported to the site users over the network via tunneling 273. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

Figure 20:
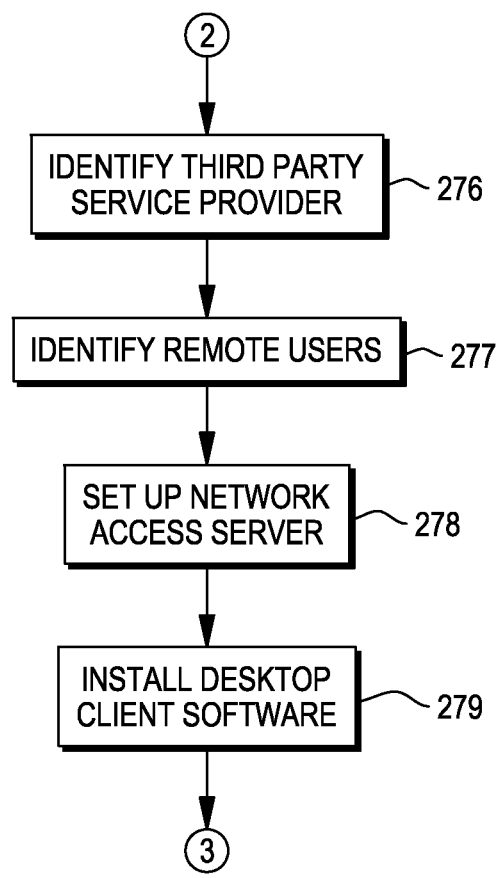
FIG. 20 is a flow diagram of a design process used in semiconductor design, manufacture, and/or test.

In FIG. 20, step 260 begins the Virtual Private Network (VPN) process. A determination is made to see if a VPN for remote access is required 261. If it is not required, then proceed to 262. If it is required, then determine if the remote access VPN exists 264. If it does exist, then proceed to 265. Otherwise, the embodiments identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is, the process software is divided into packets and each packet including the data and protocol is placed within another packet 267. When the process software arrives at the remote user's desktop, it is removed from the packets, reconstituted and then is executed on the remote user's desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271. After the site to site VPN has been built or if it had been previously established, the users access the process software via the VPN 272. The process software is transported to the site users over the network via tunneling. That is, the process software is divided into packets and each packet including the data and protocol is placed within another packet 274. When the process software arrives at the remote user's desktop, it is removed from the packets, reconstituted and is executed on the site user's desktop 275. Proceed to exit the process 263.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiment and the practical application, and to enable others of ordinary skill in the art to understand the embodiment for various embodiments with various modifications as are suited to the particular use contemplated.

What is claimed is:

1. A method comprising:
   receiving, into a computerized device, an indication that a computer program which interacts with relational database tables is producing incorrect values, said computer program comprising a plurality of lines of programming code, wherein an identified write line of said programming code outputs said incorrect value;
   executing said computer program using said computerized device to produce a trace of said computer program, said trace comprising a listing of each line of programming code executed, a name of each field, and a value of each field produced by each line of programming code executed;
   dividing said trace into independent threads of execution using said computerized device, each of said independent threads of execution comprising an execution sequence of said lines of programming code that ends with said identified write line of programming code,
   identifying key fields within each of said independent threads of execution using said computerized device, said key fields impacting the computation sequence leading up to said identified write line of said programming code;
   identifying key-based dynamic slices from said independent threads of execution using said computerized device, wherein each of said key-based dynamic slices includes ones of said lines of programming code that are used in computations processing the table records corresponding to said key fields;
   identifying at least one faulty key-based dynamic slice that outputs one of said incorrect values when executing said identified write line of programming code, and identifying good key-based dynamic slices that output a correct value when executing said identified write line of programming code, using said computerized device;
   determining differences between said faulty key-based dynamic slice and said good key-based dynamic slices using said computerized device to identify at least one potential fault area of said faulty key-based dynamic slice;
   comparing lines of programming code within said potential fault area with known error patterns using said computerized device to produce repair suggestions; and
   outputting said repair suggestions from said computerized device.

2. The method according to claim 1, said key fields comprising sorting keys of said relational database tables.

3. The method according to claim 1, said faulty key-based dynamic slice maintaining different values in said key fields from said good key-based dynamic slices.

4. The method according to claim 1, said known error patterns being specific to said relational database tables.

5. The method according to claim 1, said known error patterns comprising statically known idiom specific patterns whose existence/absence is known to result in error with a predetermined high probability.

6. The method according to claim 1, said computer program produces said incorrect value using fault-inducing input, wherein said executing of said computer program to produce said trace also uses said fault-inducing input.

7. A method comprising:
- receiving, into a computerized device, an indication that a computer program which interacts with relational database tables is producing incorrect values, said computer program comprising a plurality of lines of programming code, wherein an identified write line of said programming code outputs said incorrect value;
- executing said computer program using said computerized device by repeating different ones of said lines of programming code in different sequences according to logical loops within said computer program to produce a trace of said computer program, said trace comprising a listing of each line of programming code executed, a name of each field, and a value of each field produced by each line of programming code executed;
- dividing said trace into independent threads of execution using said computerized device, each of said independent threads of execution comprising an execution sequence of said lines of programming code that ends with said identified write line of programming code,
- identifying key fields within each of said independent threads of execution using said computerized device, said key fields impacting the computation sequence leading up to said identified write line of said programming code;
- identifying key-based dynamic slices from said independent threads of execution using said computerized device, wherein each of said key-based dynamic slices only includes ones of said lines of programming code that are used in computations processing the table records corresponding to said key fields;
- identifying at least one faulty key-based dynamic slice that outputs one of said incorrect values when executing said identified write line of programming code, and identifying good key-based dynamic slices that output a correct value when executing said identified write line of programming code, using said computerized device;
- normalizing said key-based dynamic slices into normalized key-based dynamic slices using said computerized device by representing portions of said execution sequences that are repeated as single execution sequence instances within said normalized key-based dynamic slices; and
- merging ones of said normalized key-based dynamic slices that have the same pattern of single execution sequence instances using said computerized device to classify said key-based dynamic slices into equivalence classes;
- with said key-based dynamic slices classified into said equivalence classes, determining differences between said faulty key-based dynamic slice and said good key-based dynamic slices using said computerized device to identify at least one potential fault area of said faulty key-based dynamic slice;
- comparing lines of programming code within said potential fault area with known error patterns using said computerized device to produce repair suggestions; and
- outputting said repair suggestions from said computerized device.

8. The method according to claim 7, said key fields comprising sorting keys of said relational database tables.

9. The method according to claim 7, said faulty key-based dynamic slice maintaining different values in said key fields from said good key-based dynamic slices.

10. The method according to claim 7, said known error patterns being specific to said relational database tables.

11. The method according to claim 7, said known error patterns comprising statically known idiom specific patterns whose existence/absence is known to result in error with a predetermined high probability.

12. The method according to claim 7, said computer program produces said incorrect value using fault-inducing input, wherein said executing of said computer program to produce said trace also uses said fault-inducing input.

13. A system comprising:
- a computerized device receiving an indication that a computer program which interacts with relational database tables is producing incorrect values, said computer program comprising a plurality of lines of programming code, wherein an identified write line of said programming code outputs said incorrect values, said computerized device executing said computer program to produce a trace of said computer program, said trace comprising a listing of each line of programming code executed, a name of each field, and a value of each field produced by each line of programming code executed, said computerized device dividing said trace into independent threads of execution, each of said independent threads of execution comprising an execution sequence of said lines of programming code that ends with said identified write line of programming code;
- a dynamic slicer identifying key fields within each of said independent threads of execution, said key fields impacting the computation sequence leading up to said identified write line of said programming code, said dynamic slicer identifying key-based dynamic slices from said independent threads of execution, wherein each of said key-based dynamic slices includes ones of said lines of programming code that are used in computations processing the table records corresponding to said key fields, said computerized device identifying at least one faulty key-based dynamic slice that outputs one of said incorrect values when executing said identified write line of programming code, and said computerized device identifying good key-based dynamic slices that output a correct value when executing said identified write line of programming code;
- an equivalence classifier normalizing said key-based dynamic slices into normalized key-based dynamic slices by representing portions of said execution sequences that are repeated as single execution sequence instances within said normalized key-based dynamic slices, said equivalence classifier merging ones of said normalized key-based dynamic slices that have the same pattern of single execution sequence instances to classify said key-based dynamic slices into equivalence classes; and
- a fault localizer determines, with said key-based dynamic slices classified into said equivalence classes, differences between said faulty key-based dynamic slice and said good key-based dynamic slices to identify at least one potential fault area of said faulty key-based dynamic slice, said fault localizer comparing lines of programming code within said potential fault area with known error patterns to produce repair suggestions, said computerized device outputting said repair suggestions.

14. The system according to claim 13, said key fields comprising sorting keys of said relational database tables.

15. The system according to claim 13, said faulty key-based dynamic slice maintaining different values in said key fields from said good key-based dynamic slices.

16. The system according to claim 13, said known error patterns being specific to said relational database tables.

17. The system according to claim 13, said known error patterns comprising statically known idiom specific patterns whose existence/absence is known to result in error with a predetermined high probability.

18. The system according to claim 13, said computer program produces said incorrect value using fault-inducing input, wherein said computerized device executing said computer program to produce said trace also uses said fault-inducing input.

19. A non-transitory computer storage medium device, readable by a computerized device, said non-transitory computer storage medium device storing instructions that cause said computerized device to perform a method comprising:
   receiving an indication that a computer program which interacts with relational database tables is producing incorrect values, said computer program comprising a plurality of lines of programming code, wherein an identified write line of said programming code outputs said incorrect values;
   executing said computer program to produce a trace of said computer program, said trace comprising a listing of each line of programming code executed, a name of each field, and a value of each field produced by each line of programming code executed;
   dividing said trace into independent threads of execution, each of said independent threads of execution comprising an execution sequence of said lines of programming code that ends with said identified write line of programming code,
   identifying key fields within each of said independent threads of execution, said key fields impacting the computation sequence leading up to said identified write line of said programming code;
   identifying key-based dynamic slices from said independent threads of execution, wherein each of said key-based dynamic slices includes ones of said lines of programming code that are used in computations processing the table records corresponding to said key fields;
   identifying at least one faulty key-based dynamic slice that outputs one of said incorrect values when executing said identified write line of programming code, and identifying good key-based dynamic slices that output a correct value when executing said identified write line of programming code;
   determining differences between said faulty key-based dynamic slice and said good key-based dynamic slices to identify at least one potential fault area of said faulty key-based dynamic slice;
   comparing lines of programming code within said potential fault area with known error patterns to produce repair suggestions; and
   outputting said repair suggestions.

20. The non-transitory computer storage medium device according to claim 19, said key fields comprising sorting keys of said relational database tables.

21. The non-transitory computer storage medium device according to claim 19, said faulty key-based dynamic slice maintaining different values in said key fields from said good key-based dynamic slices.

22. The non-transitory computer storage medium device according to claim 19, said known error patterns being specific to said relational database tables.

23. The non-transitory computer storage medium device according to claim 19, said known error patterns comprising statically known idiom specific patterns whose existence/absence is known to result in error with a predetermined high probability.

24. The non-transitory computer storage medium device according to claim 19, said computer program produces said incorrect value using fault-inducing input, wherein said executing of said computer program to produce said trace also uses said fault-inducing input.

25. The non-transitory computer storage medium device according to claim 19, said repair suggestions comprising suggested changes to said lines of programming code.

* * * * *